United States Patent
Price et al.

(10) Patent No.: US 11,244,430 B2
(45) Date of Patent: Feb. 8, 2022

(54) DIGITAL IMAGE FILL

(71) Applicant: Adobe Inc., San Jose, CA (US)

(72) Inventors: Brian Lynn Price, Pleasant Grove, UT (US); Yinan Zhao, Austin, TX (US); Scott David Cohen, Cupertino, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/830,005

(22) Filed: Mar. 25, 2020

(65) Prior Publication Data

US 2020/0226725 A1 Jul. 16, 2020

Related U.S. Application Data

(62) Division of application No. 15/879,354, filed on Jan. 24, 2018, now Pat. No. 10,699,388.

(51) Int. Cl.
*G06T 5/00* (2006.01)
*G06N 3/04* (2006.01)
(Continued)

(52) U.S. Cl.
CPC .......... *G06T 5/005* (2013.01); *G06N 3/0454* (2013.01); *G06N 3/0472* (2013.01); *G06N 3/08* (2013.01); *G06N 3/084* (2013.01); *G06T 3/0006* (2013.01); *G06T 5/002* (2013.01); *G06T 5/50* (2013.01); *G06T 7/337* (2017.01); *G06T 7/344* (2017.01);
(Continued)

(58) Field of Classification Search
CPC .......... G06T 5/005; G06T 5/002; G06T 5/50; G06T 7/344; G06T 7/337; G06T 3/0006; G06T 11/40; G06T 2207/20024; G06T 2207/20081; G06T 2207/20084; G06N 3/0454; G06N 3/0472; G06N 3/08; G06N 3/084
See application file for complete search history.

(56) References Cited

U.S. PATENT DOCUMENTS

| 10,699,388 B2 | 6/2020 | Price et al. |
| 2015/0235399 A1* | 8/2015 | Shechtman ............. G06T 5/005 345/639 |

(Continued)

OTHER PUBLICATIONS

"Non-Final Office Action", U.S. Appl. No. 15/879,354, dated Nov. 1, 2019, 13 pages.

(Continued)

*Primary Examiner* — Kenny A Cese
(74) *Attorney, Agent, or Firm* — FIG. 1 Patents

(57) ABSTRACT

Fill techniques as implemented by a computing device are described to perform hole filling of a digital image. In one example, deeply learned features of a digital image using machine learning are used by a computing device as a basis to search a digital image repository to locate the guidance digital image. Once located, machine learning techniques are then used to align the guidance digital image with the hole to be filled in the digital image. Once aligned, the guidance digital image is then used to guide generation of fill for the hole in the digital image. Machine learning techniques are used to determine which parts of the guidance digital image are to be blended to fill the hole in the digital image and which parts of the hole are to receive new content that is synthesized by the computing device.

20 Claims, 11 Drawing Sheets

(51) Int. Cl.
  *G06T 7/33* (2017.01)
  *G06N 3/08* (2006.01)
  *G06T 3/00* (2006.01)
  *G06T 11/40* (2006.01)
  *G06T 5/50* (2006.01)

(52) U.S. Cl.
  CPC .... *G06T 11/40* (2013.01); *G06T 2207/20024* (2013.01); *G06T 2207/20081* (2013.01); *G06T 2207/20084* (2013.01)

(56) References Cited

U.S. PATENT DOCUMENTS

| | | |
|---|---|---|
| 2017/0024864 A1* | 1/2017 | Karande ............... G06T 7/13 |
| 2018/0047186 A1* | 2/2018 | Sato ................... G06T 5/005 |
| 2018/0075581 A1 | 3/2018 | Shi et al. |
| 2018/0082715 A1 | 3/2018 | Rymkowski et al. |
| 2019/0102872 A1* | 4/2019 | Moussa ............... G06F 3/01 |
| 2019/0228508 A1 | 7/2019 | Price et al. |

OTHER PUBLICATIONS

"Notice of Allowance", U.S. Appl. No. 15/879,354, dated Mar. 23, 2020, 8 pages.
"Pre-Interview First Office Action", U.S. Appl. No. 15/879,354, dated Nov. 19, 2019, 3 pages.
"Restriction Requirement", U.S. Appl. No. 15/879,354, dated Jul. 29, 2019, 6 pages.

\* cited by examiner

DIGITAL IMAGE FILL

RELATED APPLICATIONS

This Application claims priority as a divisional to U.S. patent application Ser. No. 15/879,354, filed Jan. 24, 2018, and titled Digital Image Fill, the entire disclosure of which is hereby incorporated by reference.

BACKGROUND

Hole filling may be used by a computing device to support a variety of digital image processing. In one example, a missing portion of a digital image is replaced or restored, e.g., due to corruption of the digital image. In another example, an object in the digital image is replaced with another object. Thus, hole filling may be used by a computing device to restore digital images as well as create new art forms by replacing one object with another.

Conventional techniques to perform hole filling are faced with numerous challenges. Initially, fill techniques were developed in which a fill is generated by a computing device based on texture and color taken from other portions of the digital image. Although these techniques functioned well for digital images having simple textured backgrounds, these techniques often failed and thus looked unrealistic for structured or complex scenes.

Additional fill techniques were then developed. In these techniques, a search was made through an image repository (e.g., of stock digital images) to locate a digital image having content that is similar to content included in a digital image having a hole to be filled. However, in practice it may be difficult to locate a digital image that is sufficiently similar that may be used as a basis to fill the hole, such as due to differences in texture, parts that may provide a good match for a portion of the hole but not for other parts of the hole, and so forth. Thus, although conventional fill techniques may support additional functionality over previous fill techniques, these techniques may also fail to produce realistic results in real-world scenarios.

SUMMARY

Digital image fill techniques as implemented by a computing device are described to perform hole filling of a digital image. In one example, deeply learned features of a digital image using machine learning are used by a computing device as a basis to search a digital image repository to locate the guidance digital image. Once located, machine learning techniques are then used to align the guidance digital image with the hole to be filled in the digital image. Once aligned, the guidance digital image is then used to guide generation of fill for the hole in the digital image. Machine learning techniques are used to determine which parts of the guidance digital image are to be blended to fill the hole in the digital image and which parts of the hole are to receive new content that is synthesized by the computing device.

To do so, an attention map is generated by processing the digital image having the hole to be filled and the guidance digital image using a convolutional neural network by a computing device. The attention map describes similarity of respective features to each other between the digital image having the hole to be filled and the guidance digital image. Parts of the hole that are not filled using the guidance digital image, based on the attention map, are synthesized by the computing device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
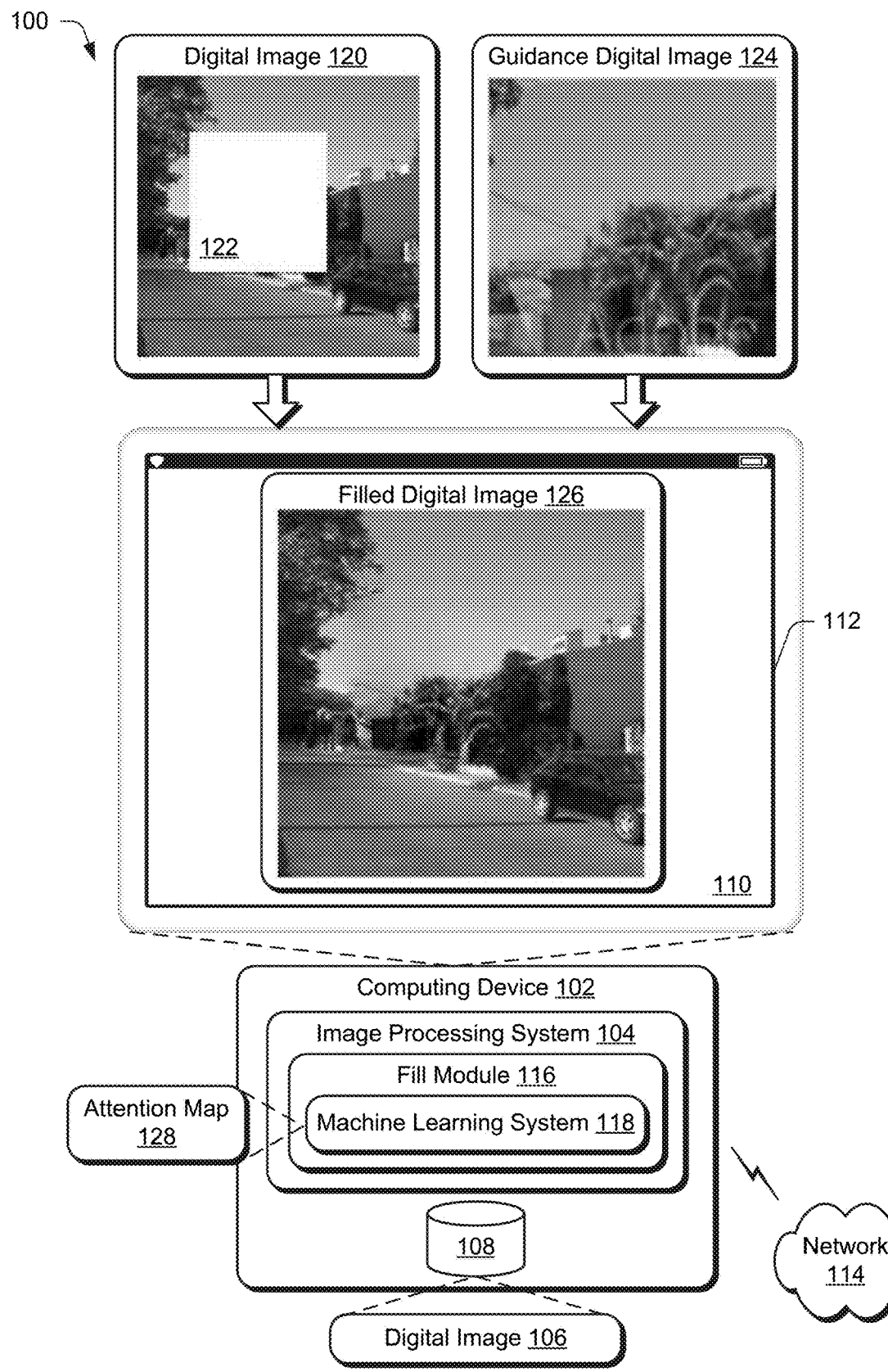
FIG. 1 is an illustration of an environment in an example implementation that is operable to employ digital image fill techniques described herein.

Conventional techniques used by a computing device to fill a hole in a digital image are confronted with a variety of challenges that may cause the fill to look unrealistic. Conventional fill techniques, for instance, initially employed content included in other parts of the digital image to fill a hole in the digital image. Although these initial conventional fill techniques may operate well for digital images having simple backgrounds, these techniques may look unrealistic for digital images having complex and structured backgrounds.

In another example, subsequent conventional fill techniques rely on other digital images "outside" of the digital image to be filled. However, these conventional fill techniques may fail because it is often difficult in practice to find other digital images (e.g., from a stock digital image repository) that entirely match the content in the digital image having the hole to be filled. For example, eighty percent of the boundary of the hole may look realistic when using a portion of another digital image to fill the hole, but the other twenty percent may not match and may thus look unrealistic. This may cause the overall result to then look unrealistic and thus fail for its intended purpose.

Accordingly, improved fill techniques are described that are usable to use an additional digital image (e.g., a stock digital image) as guidance to fill a hole in a digital image in an improved and computationally efficient manner over conventional techniques. In one example, deeply learned features of a digital image using machine learning are used by a computing device as a basis to search a digital image repository to locate the guidance digital image. The features, for instance, may be extracted from a layer of a convolutional neural network as activations used by nodes of that layer to describe the digital image. These features may then be used as a basis of comparison with features of other digital images to locate a similar digital image. In this way, thousands and even millions of digital images may be searched to locate a digital image, automatically and without user intervention, by a computing device. Further, this may be performed in real time to locate a guidance digital image that is a "best fit" to the digital image having the hole to be filled, which is not possible to be performed manually by a human being.

Once located, machine learning techniques are then used to align the guidance digital image with the hole to be filled in the digital image. A computing device, for instance, may compare the features extracted from the layer of a convolutional neural network for the guidance digital image to features extracted using that layer from the digital image having the hole. This comparison is used as a basis to generate parameters that describe how to align the guidance digital image to the hole, e.g., affine parameters such as translation, rotation, and/or scaling.

Once aligned, the guidance digital image is then used to guide generation of fill for the hole in the digital image. As previously described, in practice it is difficult to locate a guidance digital image that has content that is an exact match for content in the digital image having the hole. This may result, for instance, in parts of the guidance digital image that may be used to accurately guide generation of the fill and other parts that are not. Accordingly, in the techniques described herein machine learning techniques are used to determine which parts of the guidance digital image are to be blended to fill the hole in the digital image and which parts of the hole are to receive new content that is synthesized by the computing device.

To do so, an attention map is generated by processing the digital image having the hole to be filled and the guidance digital image using a convolutional neural network by a computing device. The attention map describes similarity of respective features to each other between the digital image having the hole to be filed and the guidance digital image. Thus, the attention map may be used to describe which parts (e.g., pixels) of the guidance digital image are to be used as a basis to fill the portion to be filled in the digital image and which parts are not. Parts of the guidance digital image that are to be used as basis to fill the hole are copied into the hole and blended with other parts of the digital image, e.g., to blend color, texture, and other visual characteristics. Parts of the hole that are not filled using the guidance digital image, based on the attention map, are synthesized by the computing device. In this way, the hole is filled automatically and without user intervention by the computing device in a computationally efficient manner over conventional techniques to have a realistic fill.

Techniques are also described to train the convolutional neural network to generate the attention map. In one example, a pair of digital images are selected from an image repository, e.g., from a collection of stock digital images. In an implementation, the pair of digital images are selected randomly regardless of similarity of the images to each other.

A first digital image from the pair is specified as a training ground truth digital image. A training portion is selected by the computing device from the first digital image and added to and blended with the second digital image, e.g., to blend color, texture, and so forth. In one implementation, the blended second digital image is used as part of machine learning as a training guidance digital image. For example, a branch of a machine learning system used to generate an attention map may be trained to identify which pixels from the blended second digital image best match the digital image with the hole.

In another implementation, a larger portion is selected from the second digital image by the computing device that encompasses the blended training portion and also includes an additional part of the second digital image. A training guidance digital image is then generated by adding the selected larger portion back to the ground truth digital image, i.e., the first digital image. In this way, a ground truth digital image and a guidance digital image are generated and used by the computing device to train the convolutional neural network. A loss function and back propagation, for instance, may be used to train the neural network based on differences between results achieved for the training guidance digital image and the ground truth digital image.

The training portion copied to the second digital image acts to train the convolutional neural network to recognize which portions are to be copied and blended as part of filling a hole in a digital image. The additional portion acts to train the convolutional neural network to recognize which portions of the hole are to be synthesized and are not copied over. In this way, the computing device may generate a multitude of training digital images (e.g., thousands and even millions) in an efficient and accurate manner to train the convolutional neural network to generate the attention map automatically and without user intervention by the computing device, which is not possible to be performed by a human being. Further discussion of these and other examples is included in the following sections and shown in corresponding figures.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ fill techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 11.

The computing device 102 is illustrated as including an image processing system 104. The image processing system 104 is implemented at least partially in hardware of the computing device 102 to process and transform a digital image 106, which is illustrated as maintained in storage 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 may also be implemented as whole or part via functionality available via the network 114, such as part of a web service or "in the cloud."

An example of functionality incorporated by the image processing system 104 to process the image 106 is illustrated as a fill module 116 that includes a machine learning system 118. The fill module 116 implements functionality to receive as an input a digital image 120 having a hole 122 to be filled. From this, the fill module 116 selects a guidance digital image 124 and outputs a filled digital image 126 automatically and without user intervention. Other examples are also contemplated, such as to support user selection of the guidance digital image 124 to create new types of artwork. The filling of the hole 122 by the fill module 116 is guided by the guidance digital image 124 using machine learning as performed by the machine learning system 118.

The fill module 116 and associated machine learning system 118 support numerous advantages over conventional techniques used to fill a hole in a digital image. For example, the machine learning system 118 may be used to locate the guidance digital image 124 in a computationally efficient manner. This is performed by comparing features extracted from the digital image 120 to fill using machine learning with features extracted from guidance digital image candidates, e.g., from a stock image service provider system. In this way, a guidance digital image 124 may be selected having content that most closely resembles content of the digital image 120 to be filled.

Once selected, the machine learning system 118 is also configured to align the guidance digital image 124 with the hole 122 in the digital image 120 to be filled. To do so, an attention map 128 is generated by the machine learning system 118 to describe parameters that specify a translation, rotation, and/or scaling of the guidance digital image 124 with respect to the hole 122. This may be performed also through comparison of features of the guidance digital image 124 and the digital image 120 that are extracted through machine learning.

Figure 2:
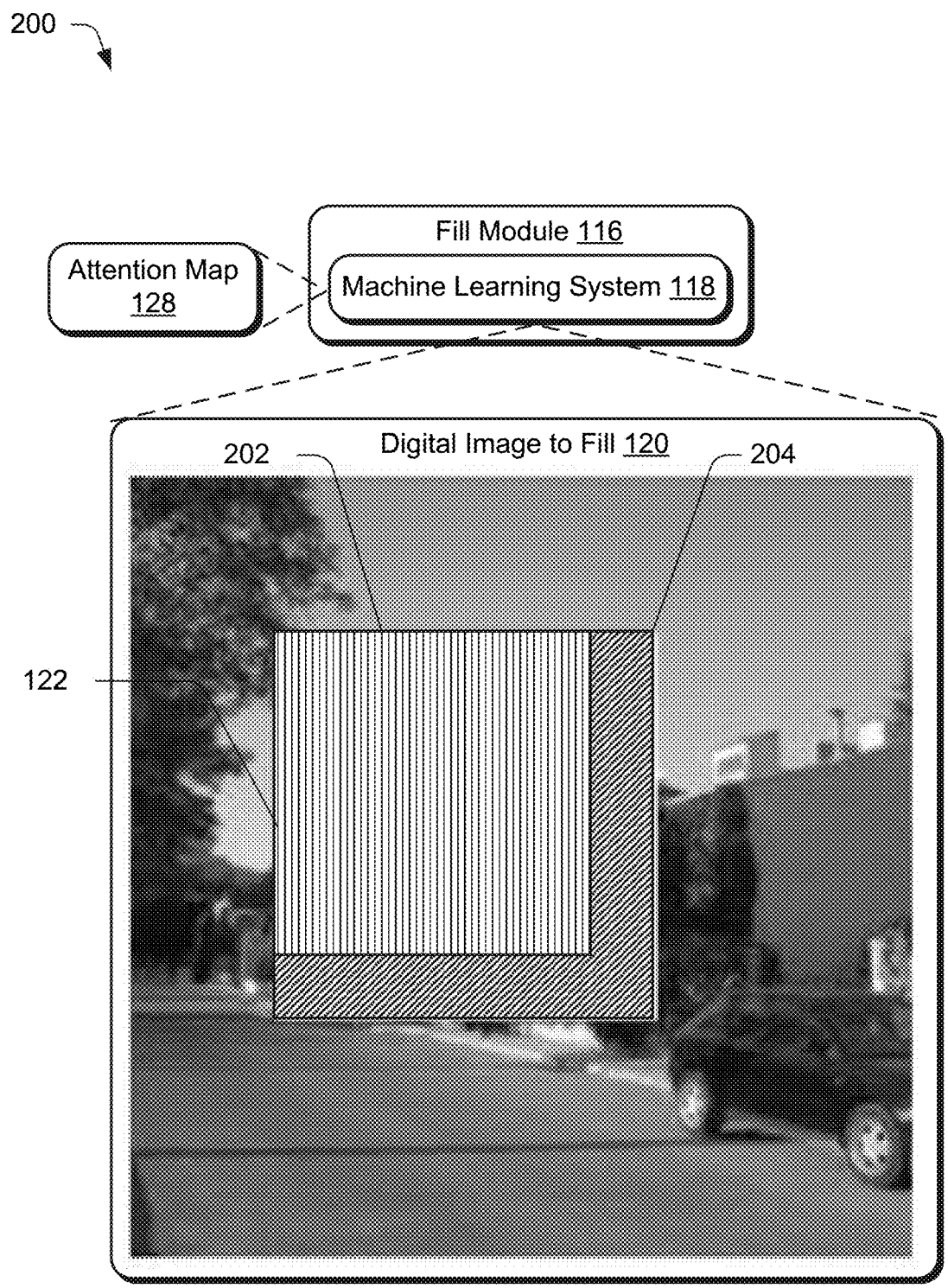
FIG. 2 depicts an example in which a hole is filled using blending of a portion taken from a guidance digital image and a part that is synthesized.

The attention map 128 is also usable to describe which pixels are to be copied from the guidance digital image 124 to fill the hole 122 and which pixels are to be synthesized to fill the hole 122. As previously described, in practice it is difficult to locate a guidance digital image that has content that is an exact match for content in the digital image 120 having the hole 122. This may result, for instance, in parts of the guidance digital image 202 that may be used to accurately guide generation of the fill and other parts that are not 204 as shown in the example implementation 220 in FIG. 2.

The attention map 128 describes similarity of respective features to each other between the digital image 120 having the hole 122 to be filed and the guidance digital image 124. Thus, the attention map may be used to describe which parts (e.g., pixels) of the guidance digital image 124 are to be used as a basis to fill the portion to be filled in the digital image and which parts are not. The parts that are not taken from the guidance digital images 124 are synthesized by the machine learning system 118 and thus promotes realism over conventional fill techniques by preventing potentially distracting visual artifacts.

The following discussion begins with an example of training a machine learning system 118 to generate an attention map 128 and the generation of training digital images used to do so by a computing device. Operation of the machine learning system 118 to perform fill techniques is then described, which includes alignment and generation of parameters, generation of fill using a combination of blending and synthesis, use of a skip-layer connection as part of decoding, and ranking of candidates.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Training Data Generation

Figure 3:
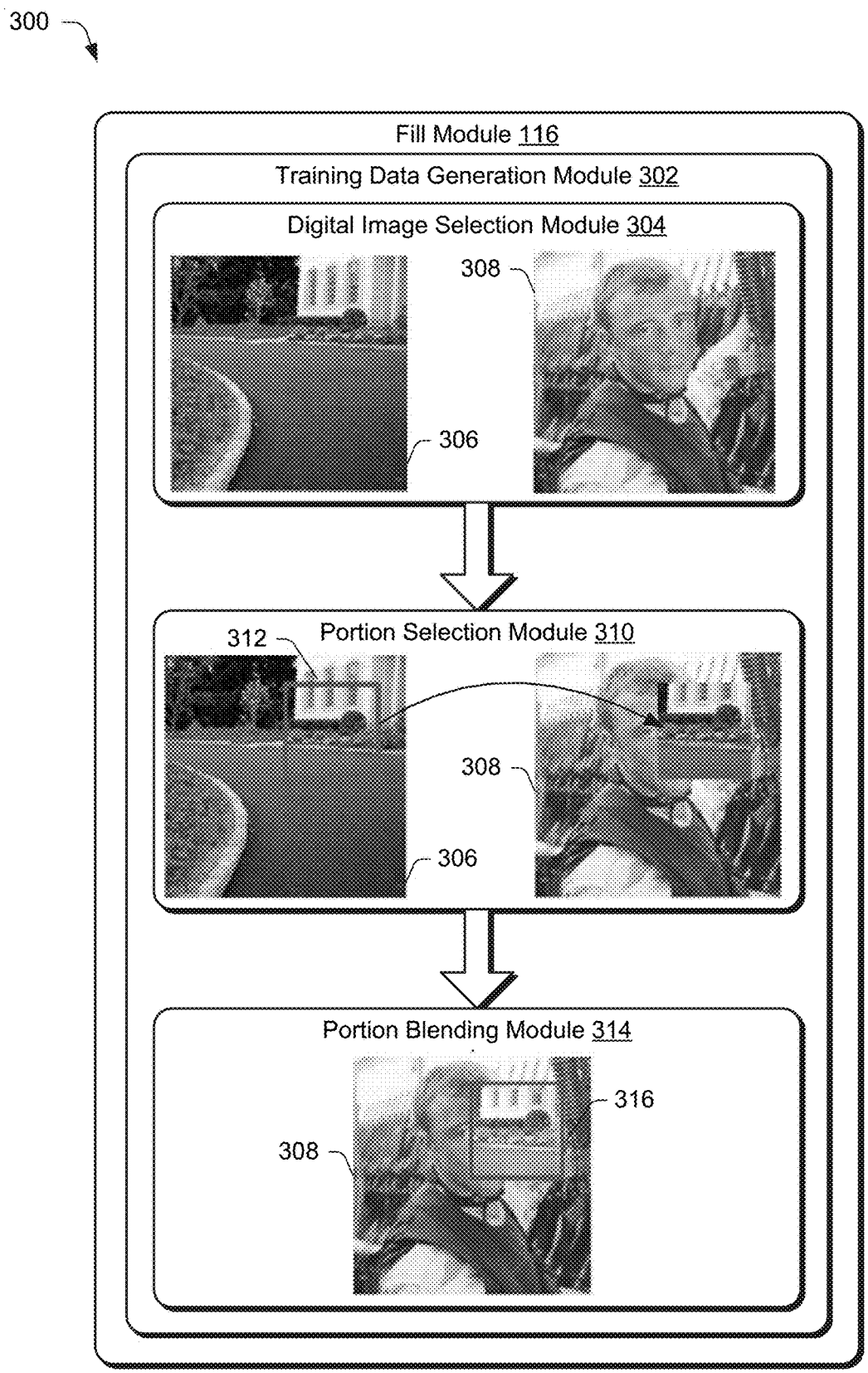
FIGS. 3 and 4 depict examples of a system to generate training digital images to train a neural network of a machine learning system to generate an attention map.
Figure 4:
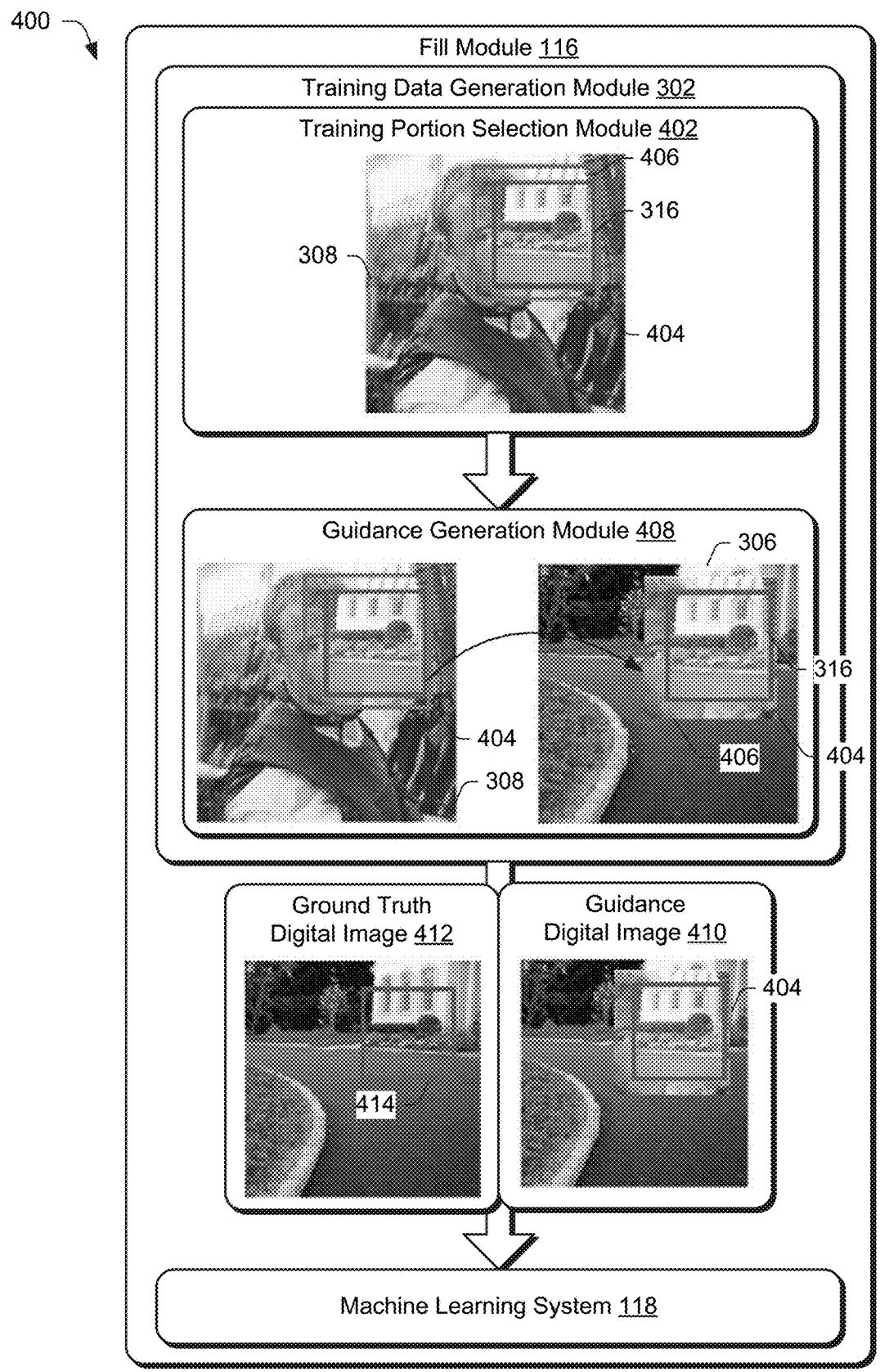
Figure 5:
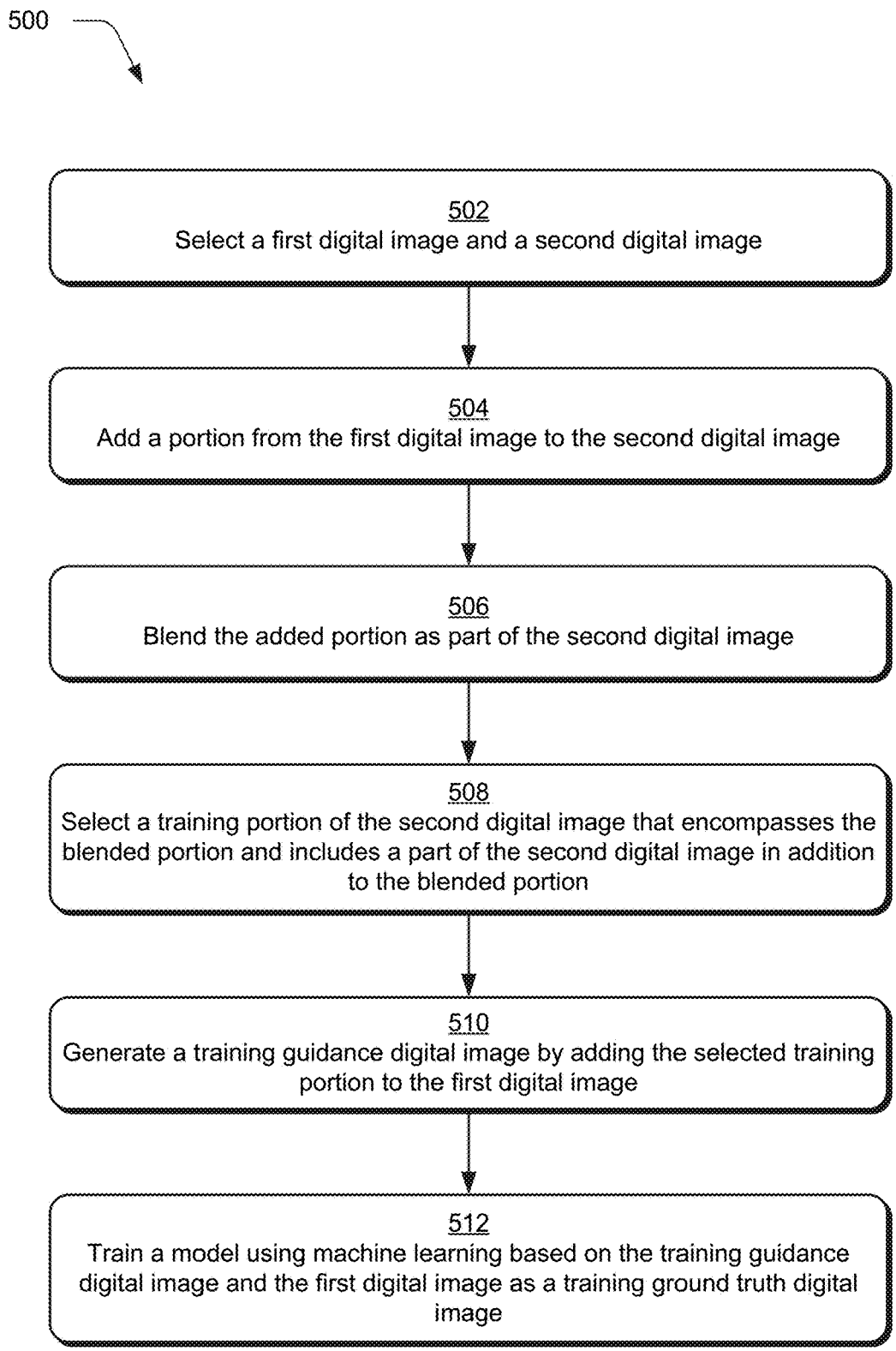
FIG. 5 is a flow diagram depicting a procedure in an example implementation of generation of training digital images usable to train a model using machine learning to generate an attention map.

FIGS. 3 and 4 depict examples 300, 400 of a system to generate training digital images to train a neural network of a machine learning system 118 to generate an attention map 128. FIG. 5 depicts a procedure 500 in an example implementation of generation of training digital images usable to train a model using machine learning to generate an attention map 128.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeably to FIGS. 1-5.

To train a model by the machine learning system (e.g., a neural network) to generate an attention map 128, pairs of training images having holes and training guidance digital images are generated. To do so in this example, the same digital image is used to generate both a ground truth digital image and guidance digital image using a training data generation module 302 as follows.

To begin, a digital image selection module 304 of the training data generation module 302 selects a first digital image 306 and a second digital image 308. As illustrated, these digital images may be chosen randomly such that the first and second digital images 306, 308 are not visually similar to each other, e.g., different content, textures, colors, and so forth. The first digital image 306 in this example is specified as a training ground truth digital image (block 502) in this example as described in greater detail below.

A portion selection module 310 is then used to add a portion 312 from the first digital image 306 to the second digital image 308 (block 504). The portion 312, for instance, may be selected randomly from an area designated as a hole 122 in the first digital image. For example, the portion 312 may have a randomly chosen width and height at a location within the hole 122.

A portion blending module 314 is then used to blend the portion 312 with the second digital image 308 (block 506) to form a blended portion 316. The portion blending module 314, for instance, may use Poisson blending. Poisson blending is an image editing technique in which edges, corners, and transition are maintained through use of a gradient domain based on the realization that the human visual system is more sensitive to contrast that intensity values. A variety of other blending techniques may also be used to blend color, texture, and so on of the portion 312 with the second digital image 308. In one implementation, the blended second digital image 308 is used as part of machine learning as a training guidance digital image. For example, a branch of a machine learning system used to generate an attention map 128 (e.g., the third machine-learning branch 606 of FIG. 6) may be trained to identify which pixels from the blended second digital image best match the digital image with a hole, e.g., a ground truth digital image. As a result, a convolutional neural network 620 of the third machine learning branch 606 may be trained to generate the attention map 128 to describe corresponding of pixels of the guidance digital image 124 with the ground truth digital image.

In another implementation, a guidance digital image is generated by copying this blended portion back into the first digital image 306. For example, as shown in FIG. 4 a training portion selection module 402 is then used to select a training portion 404 from the second digital image 308. The training portion 404 encompasses the blended portion 316 and includes a part 406 of the second digital image 308 in addition to the blended portion 316 (block 508), i.e., lies "outside" the blended portion 316. The training portion selection module 402, for instance, may generate random numbers that define a height and width that encompasses the blended portion 316, such that the training portion 404 is larger in at least one direction than the random numbers used to define the blended portion 316. Thus, the training portion 404 is selected to be larger than the blended portion 316 to include content from both images.

A guidance generation module 408 then adds the selected training portion 404 from the second digital image 308 to the first digital image 306 (block 510) to create a guidance digital image 410. This results in a guidance digital image 410 having a training portion 404 that includes a blended portion 316 that is visually different from the first digital image 306. The blended portion 316 is at least partially encompassed by a gap having the part 406 taken from the second digital image 308.

As a result, the part 406 of the training portion 404 that forms that gap includes content that is irrelevant to filling a hole in a digital image. This thus trains the model to learn which part of the training portion 404 is to be used to fill and which part is not. For example, part of the training portion 404 used to fill the hole is copied over and blended from the guidance digital image 410. Remaining gaps in the hole are synthesized. Thus, the first digital image 306 in this example may serve to form a ground truth digital image 412 having a defined hole 414 to be filled and a guidance digital image 410 usable to train a model using machine learning (block 512), e.g., as part of a convolutional neural network of the machine learning system 118.

In an implementation, this is performed for twenty thousand images in a training set, in which fifty pairs of ground truth digital images 412 and guidance digital images 410 are generated to create one million pairs for training the model by the machine learning system 118. Thus, this technique is capable of producing a multitude of accurate training images to train the model by the computing device 102, which is not possible to be performed by a human being. The model may then be used to generate an attention map 128 to perform fill techniques by the machine learning system 118, an example of which is further described in the following section and shown in corresponding figures.

Digital Image Fill

Figure 6:
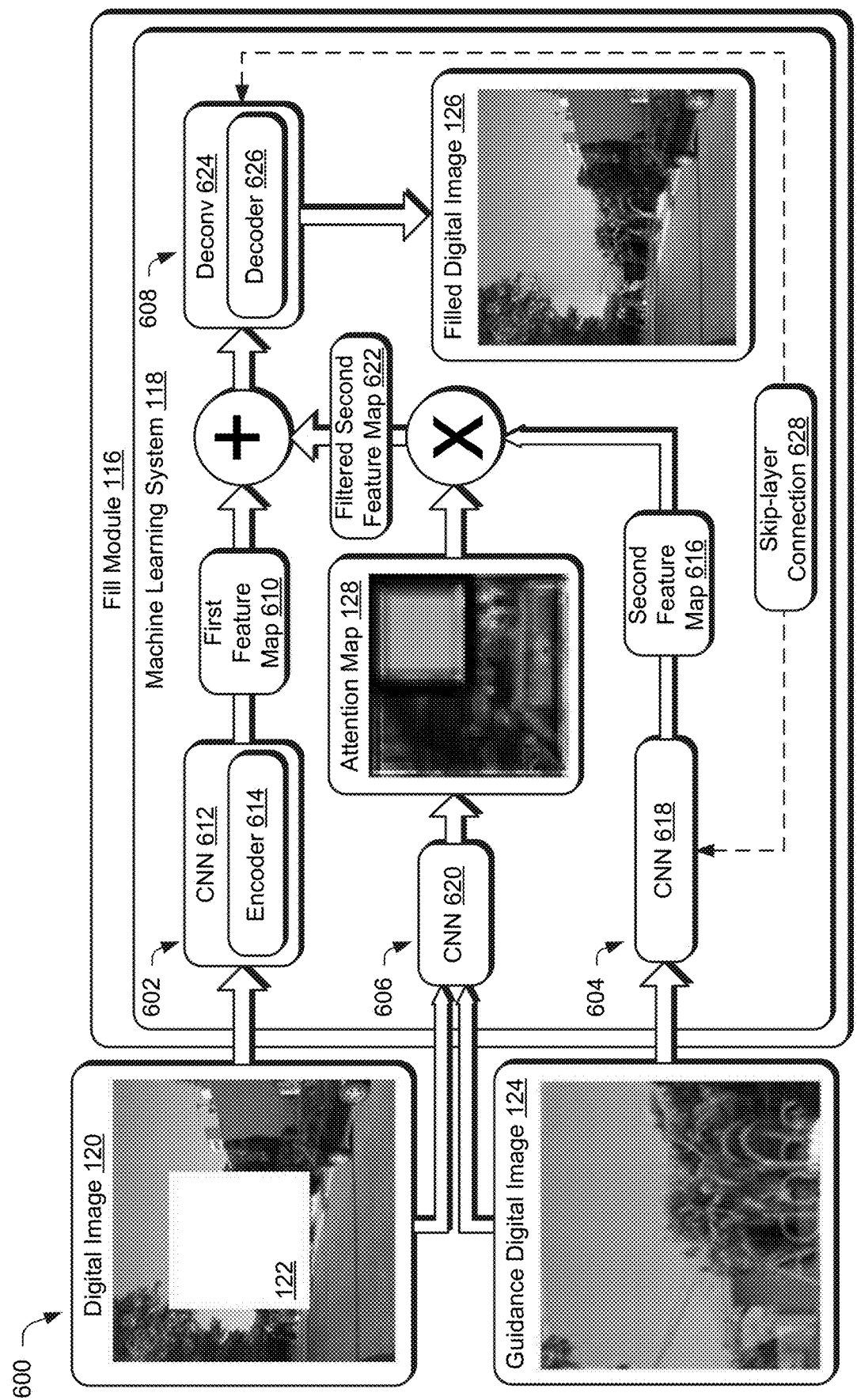
FIG. 6 depicts a system in an example implementation showing operation of a machine learning system of FIG. 1 in greater detail as filling a digital image based on an attention map generated by a model trained using training digital image pairs of FIGS. 3-5.
Figure 7:
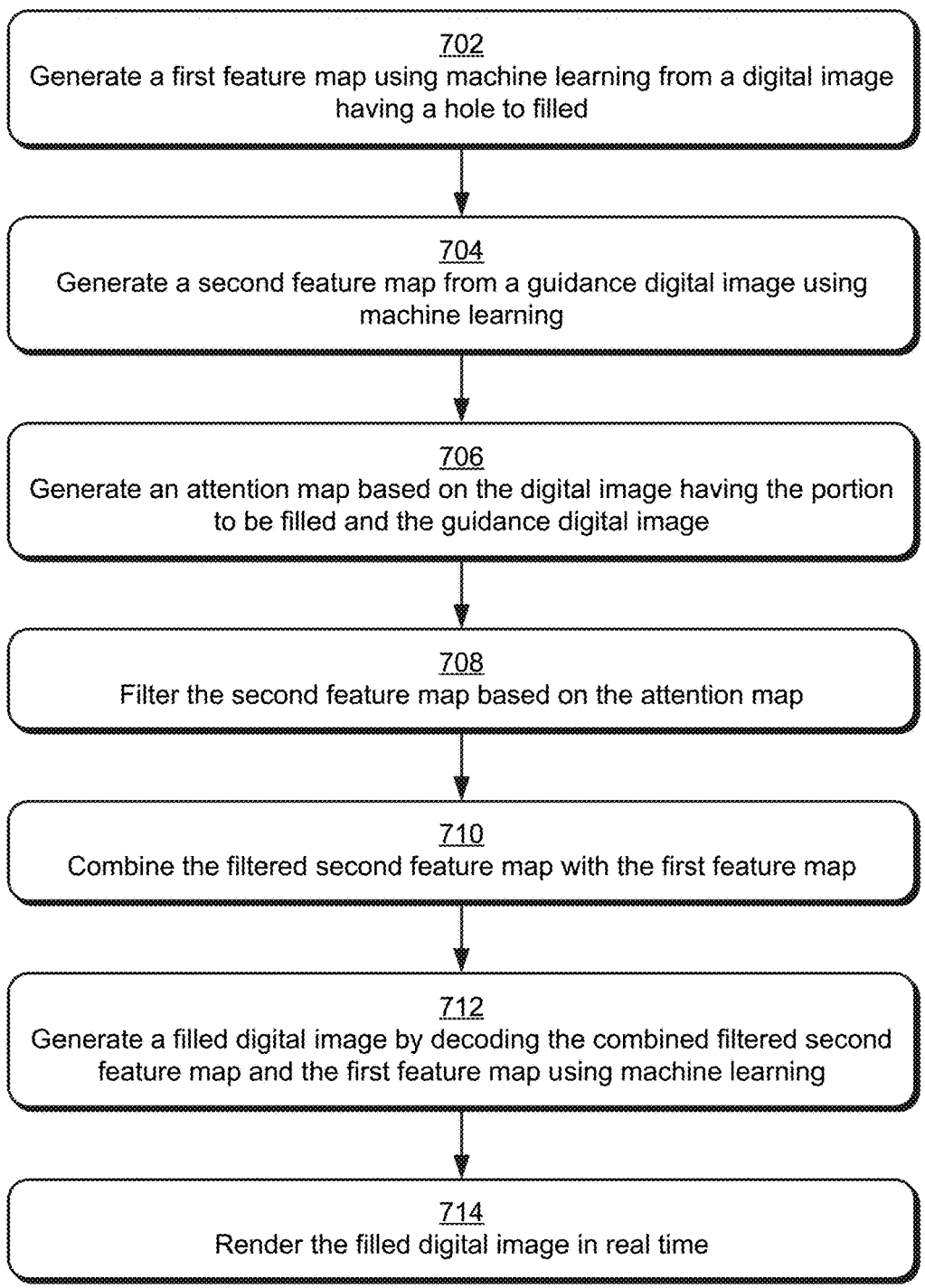
FIG. 7 is a flow diagram depicting a procedure in an example implementation in which feature maps are generated using machine learning from a digital image to be filled and a guidance digital image and used with an attention map to fill a hole in the digital image to be filled.
Figure 8:
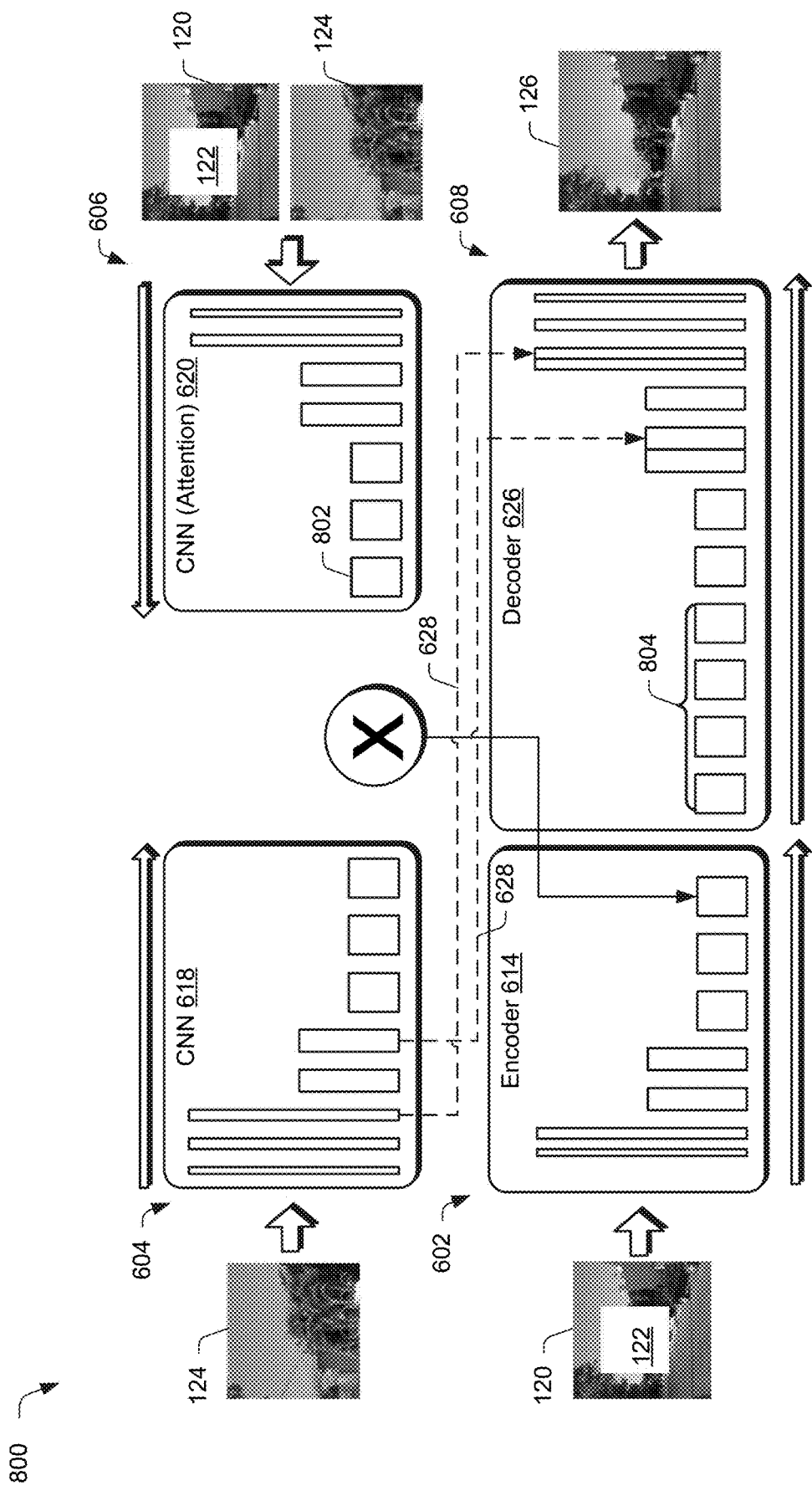
FIG. 8 depicts another system showing branches and layers of neural networks used to implement a machine learning system of FIG. 6.
Figure 9:
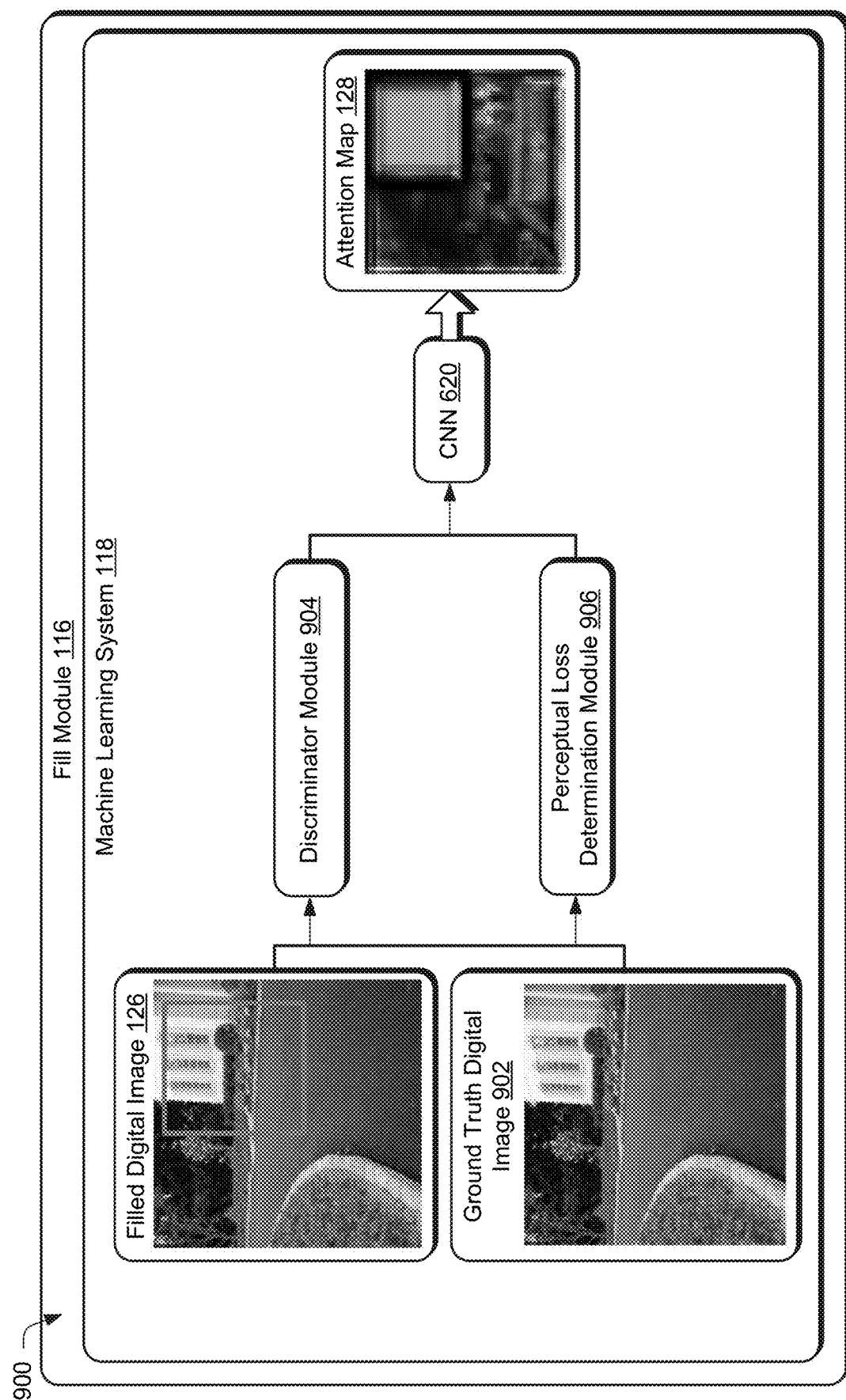
FIG. 9 depicts a system in an example implementation showing operation of the machine learning system in greater detail as employing a loss function for training.
Figure 10:
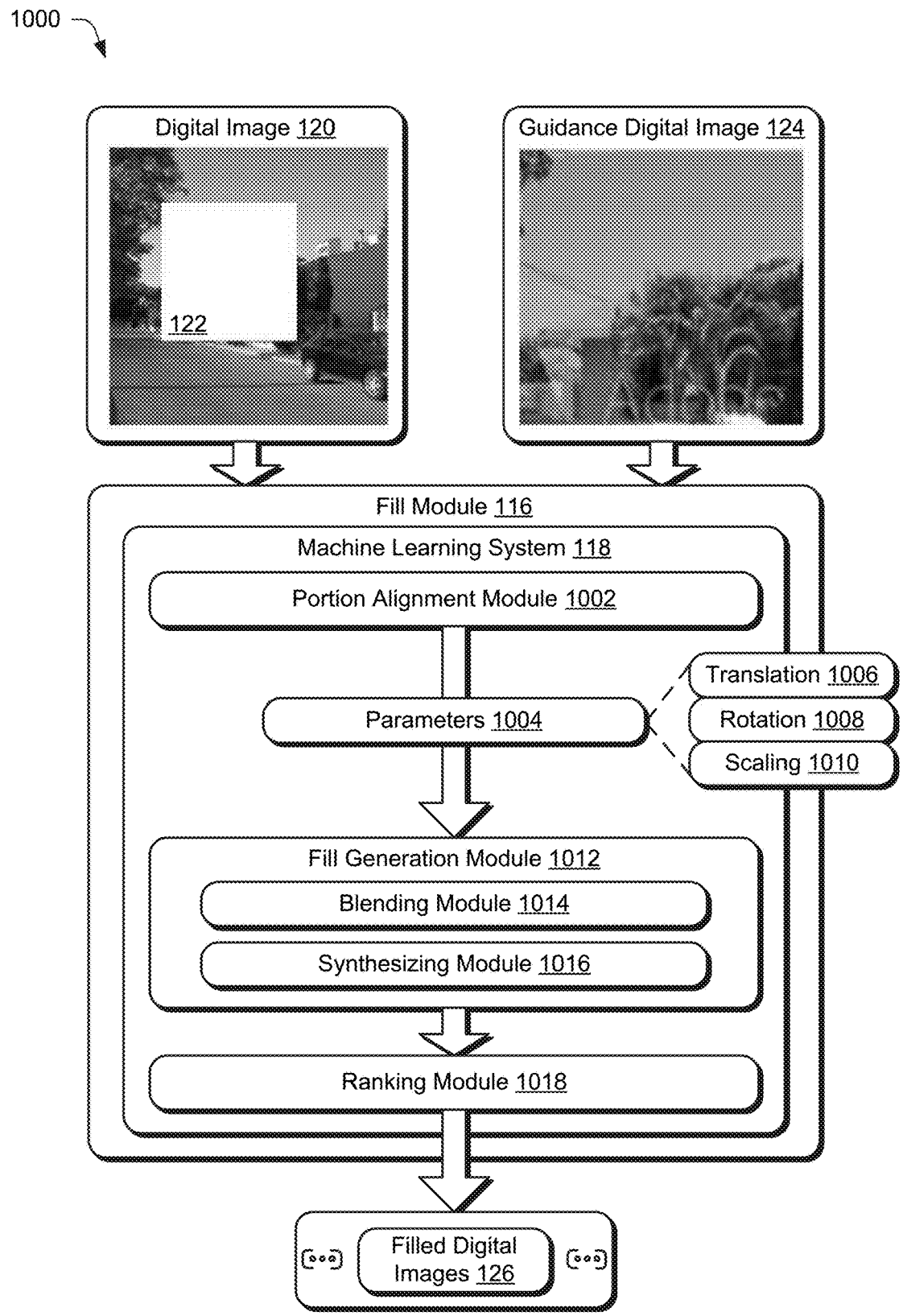
FIG. 10 depicts an example system in which parameters are generated to adjust a guidance digital image with respect to a hole in a digital image, after which blending and synthesis are performed to fill a hole in the digital image.

FIG. 6 depicts a system 600 in an example implementation showing operation of the machine learning system 118 of FIG. 1 in greater detail as filling a digital image based on an attention map generated by a model trained using training digital image pairs of FIGS. 3-5. FIG. 7 depicts a procedure 700 in an example implementation in which feature maps are generated using machine learning from a digital image to be filled and a guidance digital image and used with an attention map to fill a hole in the digital image to be filled. FIG. 8 depicts another system 800 showing branches and layers of neural networks used to implement the machine learning system 118 of FIG. 6. FIG. 9 depicts a system 900 in an example implementation showing operation of the machine learning system 118 in greater detail as employing a loss function for training. FIG. 10 depicts an example system 1000 for localization in which parameters are generated to adjust a guidance digital image with respect to a hole in a digital image, after which blending and synthesis are performed to fill a hole in the digital image.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeably to FIGS. 6-10.

The machine learning system 118, as described in relation to FIG. 1, receives as an input a digital image 120 having a hole 122 to be filled and a guidance digital image 124 and outputs a filled digital image 126. To do so, the machine learning system 118 includes a first machine-learning branch 604 to encode the digital image 120 having the hole 122 and a second machine-learning branch 604 to encode the guidance digital image 124. A third machine-learning branch 606 of the machine learning system 118 is used to generate the attention map 128 used to guide application of the guidance digital image 124 to the digital image 120 having the hole 122. A fourth machine-learning branch 608 is then used to generate the filled digital image 126.

For example, a first feature map 610 is generated from a digital image 120 having a hole 122 to be filled (block 702). The generation of the first feature map 610 is performed using machine learning in this example by a convolutional neural network (CNN) 612 that acts as an encoder 614 to extract features form the digital image 120, e.g., based on activations of nodes of a layer of the CNN. The CNN 612 includes numerous layers of nodes to apply a convolution operation to an input (e.g., the digital image 120) and pass the result to a new layer in the network. Activations of the nodes at each layer provide a feature map to describe features of respective portions of the digital image 120, e.g., to use high level information to convert description of shapes, colors, textures and other forms of higher level encoding. Further discussion of structure of the CNN 612 may be found in relation to FIG. 8.

A second feature map 616 is also generated. The second feature map 616 is generated from a guidance digital image 124 using machine learning (block 704). The second machine-learning branch 604 also includes a convolutional neural network 618 to perform the encoding. In this instance, the CNN may follow a visual geometry group (VGG) architecture, although other examples are also contemplated.

An attention map 128 is generated by the third-machine learning branch 606 using machine learning by a CNN 620 based on the digital image having the portion to be filled and the guidance digital image (block 706). The attention map 128 describes which parts (i.e., features) of the guidance digital image 124 are to be used as a basis to fill the portion to be filled in the digital image. This is performed by processing both the digital image 120 having the hole 122 and the guidance digital image 124. This is performed, for instance, by comparing features extracted from the digital image 120 to features of the guidance digital image 124 to determine relevancy of respective features to each other.

The second feature map 616 is then filtered based on the attention map 128 (block 708) to form a filtered second feature map 622 having portions of the second feature map 616 that are not relevant to filling the hole 122 of the digital image 120 as "blacked out," i.e., removed or reduced. Values of features of the second feature map 616, for instance, may be multiplied by respective values of the attention map 128 that describe an amount of relevancy of portions of the second feature map 616 (e.g., respective features). In this way a "clean" output is provided from the guidance digital image 124 as having those portions that are relevant to filling the hole 122 in the digital image 120.

The filtered second feature map is then combined with the first feature map (block 710). This may be performed in a variety of ways, examples of which include summation and concatenation.

A filled digital image 126 is then generated by decoding the combined filtered second feature map 622 and first feature map 610 using machine learning (block 712) by a de-convolutional neural network 624 as implementing a decoder 626. The filled digital image 126 is then rendered in real time in a user interface 110 of a display device 112 (block 714). In this way, the decoder 626 takes features from the first feature map 610 and relevant features from the filtered second feature map 622 to generate the filled digital image 126.

Thus, for features of the guidance digital image 124 that remain after filtering, these features are copied from the guidance digital image 124 and blended as part of generating the filled digital image 126 from the digital image 120 having the hole 122. On the other hand, image synthesis is used by the decoder 626 for a portion of the hole 122 that does not include features from the second feature map 616, i.e., for a part of the hole 122 that remains unfilled from the guidance digital image 124 based on the filtered second feature map 622. This may be performed in a variety of ways, such as based on adjacent features from the guidance digital image 124 and/or digital image 120 to synthesize "new" features which are then subsequently decoded. In this way, the generating of the filled digital image 126 improves accuracy over conventional techniques by using relevant portions of the guidance digital image 124 to fill the hole 122 and synthesizing portions that otherwise would be visually distracting.

The machine learning system 118 is also illustrated as included a skip-layer connection 628 between a CNN 618 used to generate the second feature map 616 from the guidance digital image 124 and the decoder 626. In this way, the decoder 626 can take "higher level" information as features from the CNN 618 to provide additional detail and thus preserve detail from the guidance digital image 124 than otherwise would be available from the filtered second feature map 622.

FIG. 8 depicts another system 800 showing branches and layers of neural networks used to implement the machine learning system 118 of FIG. 6. The system 800 includes the first, second, third, and fourth machine-learning branches 602, 604, 606, 608 of the system 600 of FIG. 6. The first machine-learning branch 602 implements the encoder 614 used to generate features from the digital image 120 having the hole 122. The second machine-learning branch 604 implements the CNN 618 used to generate features from the guidance digital image 124.

The third machine-learning branch 606 implements the CNN 620 used to generate the attention map 128 from the digital image 120 having the hole 122 and the guidance digital image 124. The fourth machine-learning branch 608 is used to generate the filled digital image 126 by decoding the features that remain from filtering the features of the guidance digital image 124 using the attention map and the features from the digital image 120. This may also employ a skip-layer connection 628 between respective layers of the encoder 614 and decoder 626 to preserve detail from the digital image 120.

In an implementation, the guidance digital image 124 is aligned with the hole 122 of the digital image 120 as previously described using parameters, e.g., affine parameters. The first machine-learning branch 602 used to encode the digital image 120 having the hole 122 has a four-channel input, e.g., RGB of the digital image 120 and a hole mask. The second machine-learning branch 604 used to encode the guidance digital image 124 has a three channel input, e.g., RGB of the guidance digital image 124. The CNN 620 of the third machine-learning branch 606 used to generate the attention map 128 may also follow a VGG architecture and output an attention map 128 having a size that matches the first and second feature maps 610, 616. The CNN 620, for instance, takes a seven channel input that includes the RGB of the guidance digital image 124 and RGB of the digital image 120 having the hole 122 and a hole mask. A last layer 802 of the CNN 620 is implemented as a sigmoid to normalize the output in a [0,1] range.

The second feature map 616 is then multiplied by the attention map 128 to generate the filtered second feature map 622. The filtered second feature map 622 is then added to the first feature map 610 generated from the digital image 120 having the hole 122 by the first machine-learning branch 602. The decoder 626 in this example includes four dilated layers 804 enlarge a receptive field of the first feature map 610 as added to the filtered second feature map 622, e.g., with respective dilation rates of 2, 4, 6, and 8. The filled digital image 126 may then be rendered by the computing device 102, e.g., in a user interface 110 of a display device 112.

FIG. 9 depicts a system 900 in an example implementation showing operation of the machine learning system 118 in greater detail as employing a loss function for training. In an implementation, models of the machine learning system 118 are trained jointly with loss on the filled digital image 126. This is performed using a filled digital image 126 and a ground truth digital image 902. A loss function is implemented using a discriminator module 904 and a perceptual loss determination module 906.

The discriminator module 902 implements another neural network in an adversarial setup with respect to an output of the system 600 of FIG. 6 to determine whether received digital images are real or fake. A result of this determination is then fed back as a loos function to the machine learning system 118 to adjust parameters of the system 600. For example, the discriminator module 902 may determine that the filled digital image 126 is fake and thus did not "fool" the discriminator module 902. Accordingly, the first, second, third, and/or fourth machine-learning branches 602-608 may be adjusted accordingly, a CNN 620 of the third machine-learning branch 606 used to generate the attention map may be adjusted solely as illustrated, and so forth.

The perceptual loss determination module 904 is configured to implement the loss function based on a determination of whether the filled digital image 126 looks realistic. For example, pixels may be generated to fill the hole that, although not accurate with respect to "what was originally there" as indicated by a ground truth digital image, may still look realistic. This may be performed through analysis of high-level features used to form the filled digital image 126. In an implementation, both perceptual and adversarial loss are used as a loss function to train models of the machine learning system 118. Perception and adversarial loss, for instance, may be weighted with respect to each other, e.g., perceptual loss as 1 and adversarial loss as 0.002. Other examples of loss functions and weightings are also contemplated.

FIG. 10 depicts an example system 1000 for localization in which parameters are generated to adjust a guidance digital image with respect to a hole in a digital image, after which blending and synthesis are performed to fill a hole in the digital image. Localization refers to a technique used by the fill module 116 to locate and align a portion of a guidance digital image 124 with a hole 122 to be filled in the digital image 120. This is performed in this example using a portion alignment module 1002 that is configured to generate parameter 1004 that describe a translation 1006, rotation 1008, and/or scaling 1010 of the guidance digital image 124 with respect to the hole 122 of the digital image 120.

The parameters 1004 are then passed by the portion alignment module 1002 to a fill generation module 1012. The fill generation module 1012 acts as a "spatial transformer" to shift pixels of the guidance digital image 124 into place based on the affine parameters 1004. A blending module 1014 represents machine learning functionality to copy and blend portions of the guidance digital image 124 that are relevant to filling the hole 122 in the digital image 120, e.g., through use of the attention map 128. The synthesizing module 1016 represents machine learning functionality used to synthesize pixels for portions (i.e., "gaps") of the hole 122 that are not filled by the copied portion from the guidance digital image 124. This may be performed jointly as part of decoding as described in relation to FIG. 6 and thus although illustrated separately functionality of a machine learning system 118 to implement blending and synthesis may be implemented by a single neural network.

In an implementation, alignment and fill operations are used to generate a plurality of filled digital images 126. Accordingly, a ranking module 1018 may be used to rank the filled digital images 126 based on realism, e.g., adversarial loss and/or perceptual loss. The ranked and filled digital images 126 may then be output in a user interface 110 of a display device 112, i.e., rendered.

Example System and Device

Figure 11:
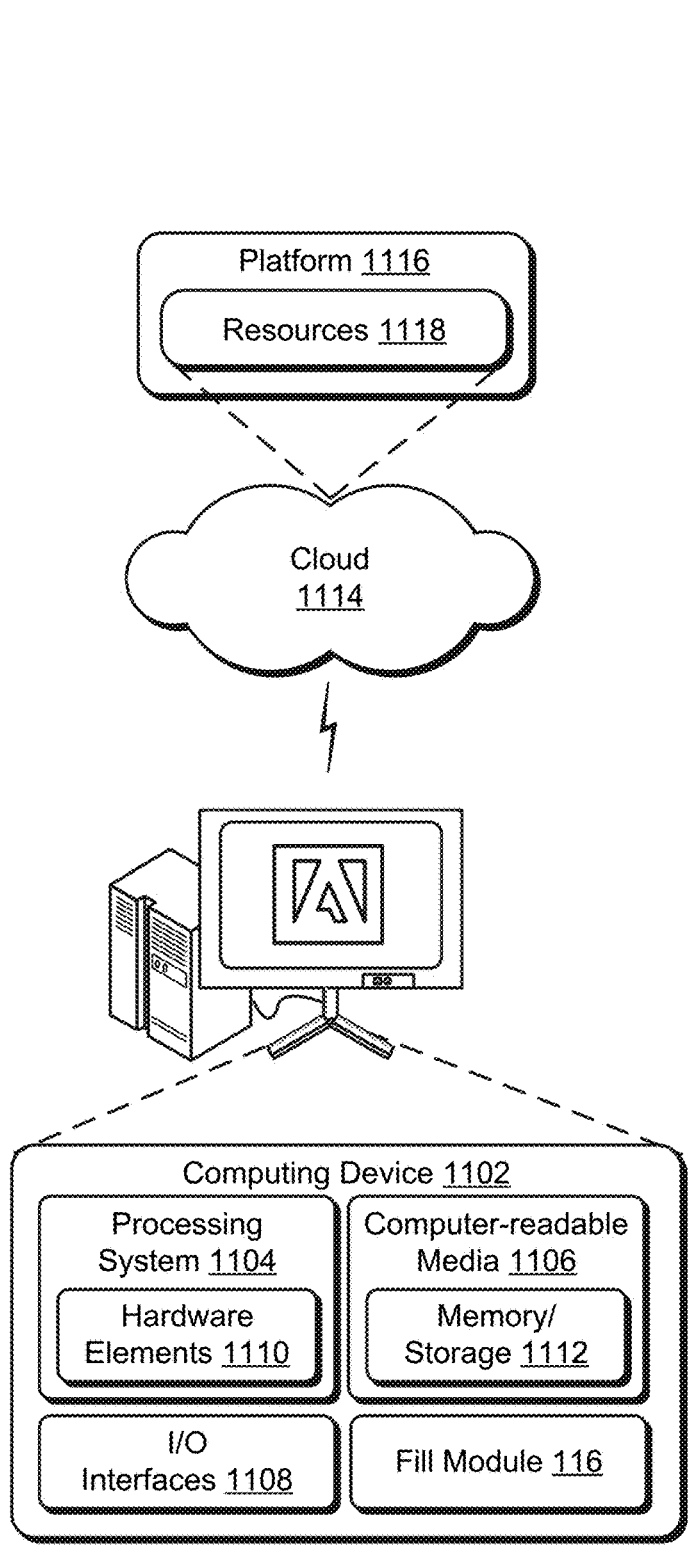
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the fill module 116. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to fill a hole in a digital image using a guidance digital image, a system comprising:
   a portion alignment module implemented at least partially in hardware of a computing device to generate parameters to align a portion of the guidance digital image with the hole to be filled in the digital image; and
   a fill generation module implemented at least partially in hardware to transform the digital image by filling the hole in the digital image based at least in part on the parameters, the filling of the hole including:
      blending the portion of the guidance digital image within a first part of the hole in the digital image; and
      generating pixels using a model trained using machine learning for a second part of the hole in the digital image that is separate from the first part of the hole in the digital image.

2. The system as described in claim 1, wherein the parameters specify at least one of a translation, a rotation, or a scaling to be applied to align the portion of the guidance digital image with respect to the hole to be filled in the digital image.

3. The system as described in claim 1, wherein the generated pixels are based at least in part on pixels of the digital image with the hole to be filled.

4. The system as described in claim 3, further comprising a ranking module to rank two or more said filled digital images based on an amount of realism exhibited by the two or more filled digital images.

5. The system as described in claim 1, wherein the parameters are affine parameters.

6. The system as described in claim 1, wherein the generated pixels are based at least in part on the portion of the guidance digital image.

7. The system as described in claim 1, wherein the portion alignment module generates the parameters using a model trained using machine learning.

8. The system as described in claim 7, wherein the portion alignment module further comprises a training data generation module to generate pairs of training digital images that include a training ground truth digital image and a training guidance digital image.

9. The system as described in claim 8, wherein the training data generation module is configured to generate the training guidance digital image by:
   selecting a first digital image as the training ground truth digital image and a second digital image;
   adding a portion from the first digital image to the second digital image; and
   blending the added portion as part of the second digital image.

10. The system as described in claim 8, wherein the training data generation module is configured to further generate the training guidance digital image by:
   selecting a training portion of the second digital image that encompasses the blended portion and a part of the second digital image in addition to the blended portion; and
   generating the training guidance digital image using the selected training portion.

11. In a digital medium environment to fill a hole in a digital image using a guidance digital image, a method implemented by a computing device, the method comprising:
   generating, by the computing device, parameters to align a portion of the guidance digital image with the hole to be filled in the digital image; and
   filling, by the computing device, the hole in the digital image based at least in part on the parameters, the filling of the hole including:
      identifying a first part of the hole in the digital image to be blended with the guidance digital image;
      identifying a second part of the hole in the digital image, the second part of the hole separate from the first part of the hole;
      blending the portion of the guidance digital image within the first part of the hole in the digital image; and
      generating pixels for the second part of the hole in the digital image using a model trained using machine learning.

12. The method as described in claim 11, wherein the parameters specify at least one of a translation, a rotation, or a scaling to be applied to align the portion of the guidance digital image with respect to the hole to be filled in the digital image.

13. The method as described in claim 11, wherein the blending is performed by a model trained using machine learning.

14. The method as described in claim 11, further comprising:
   generating two or more loss function values based on an amount of realism exhibited by the filled digital image; and
   weighting the two or more loss function values of the filled digital image, each loss function value weighted with respect to each other loss function value.

15. The method as described in claimer 14, further comprising:
   ranking the weighted loss function values of a plurality of said filled digital images.

16. The method as described in claim 11, wherein the generated pixels are based on at least part of the digital image with the hole to be filled.

17. The method as described in claim 11, wherein the generating of the parameters uses a model trained using machine learning.

18. The method as described in claim 17, further comprising generating pairs of training digital images that include a training ground truth digital image and a training guidance digital image.

19. In a digital medium environment to fill a hole in a digital image using a guidance digital image, a system comprising:
   a processing system; and
   a computer-readable storage medium having instructions stored thereon that, responsive to execution by the processing system, causes the processing system to perform operations including:
      generating parameters to align a portion of the guidance digital image with the hole to be filled in the digital image;
      identifying first and second parts of the hole using a model trained using machine learning; and
      filling the hole in the digital image based at least in part on the parameters, the filling of the hole including:

blending the portion of the guidance digital image within the first part of the hole in the digital image; and generating pixels using a model trained using machine learning to fill the second part of the hole in the digital image that is separate from the first part of the hole in the digital image.

20. The system as described in claim 19, wherein the parameters specify at least one of a translation, a rotation, or a scaling to be applied to align the portion of the guidance digital image with respect to the hole to be filled in the digital image.

* * * * *

UNITED STATES PATENT AND TRADEMARK OFFICE
CERTIFICATE OF CORRECTION

PATENT NO. : 11,244,430 B2
APPLICATION NO. : 16/830005
DATED : February 8, 2022
INVENTOR(S) : Brian Lynn Price, Yinan Zhao and Scott David Cohen Page 1 of 1

It is certified that error appears in the above-identified patent and that said Letters Patent is hereby corrected as shown below:

In the Claims

Column 16, Line 39, Claim 15 after "described in", delete "claimer", insert --claim--.

Signed and Sealed this
Fifth Day of April, 2022

Drew Hirshfeld
*Performing the Functions and Duties of the
Under Secretary of Commerce for Intellectual Property and
Director of the United States Patent and Trademark Office*